(12) United States Patent
Fruehan et al.

(10) Patent No.: US 7,753,988 B2
(45) Date of Patent: Jul. 13, 2010

(54) USE OF ALUMINA-CARBON AGGLOMERATES IN THE CARBOTHERMIC PRODUCTION OF ALUMINUM

(75) Inventors: Richard J. Fruehan, Murrysville, PA (US); David J. Roha, Greensburg, PA (US); Anders Schei, Kristiansand (NO); Mark L. Weaver, Greenwell Springs, LA (US)

(73) Assignees: Alcoa Inc., Pittsburgh, PA (US); Elkem AS, Oslo (NO)

( * ) Notice: Subject to any disclaimer, the term of this patent is extended or adjusted under 35 U.S.C. 154(b) by 277 days.

(21) Appl. No.: 11/775,112

(22) Filed: Jul. 9, 2007

(65) Prior Publication Data

US 2009/0013823 A1    Jan. 15, 2009

(51) Int. Cl.
C22B 9/10    (2006.01)
C22B 21/06   (2006.01)

(52) U.S. Cl. .......................................... 75/327; 75/329
(58) Field of Classification Search .................... 75/327
See application file for complete search history.

(56) References Cited

U.S. PATENT DOCUMENTS

| | | | | |
|---|---|---|---|---|
| 2,974,032 | A | | 3/1961 | Grunert et al. .................. 75/10 |
| 3,067,146 | A | * | 12/1962 | Rubin .................... 252/520.22 |
| 3,135,696 | A | | 6/1964 | Ruelle et al. ................. 252/182 |
| 4,033,757 | A | | 7/1977 | Kibby ........................ 75/10 R |
| 4,042,410 | A | | 8/1977 | Ito .............................. 106/117 |
| 4,099,959 | A | | 7/1978 | Dewing ...................... 75/10 R |
| 4,334,917 | A | | 6/1982 | Kibby ........................ 75/10 R |
| 4,388,107 | A | | 6/1983 | Kibby ........................ 75/10 R |
| 4,441,920 | A | * | 4/1984 | Wilkening ................. 75/10.27 |
| 4,491,471 | A | | 1/1985 | Johnston ................... 75/0.5 R |
| 4,533,386 | A | | 8/1985 | Kibby et al. ................ 75/10 R |
| 4,588,438 | A | * | 5/1986 | Fujishige et al. .............. 75/671 |
| 4,659,374 | A | * | 4/1987 | Alanko et al. ................. 75/766 |
| 4,790,986 | A | | 12/1988 | Kim et al. .................... 423/659 |
| 4,983,553 | A | | 1/1991 | Dunn et al. .................... 501/96 |
| 5,100,846 | A | * | 3/1992 | Dunn et al. ................ 501/98.4 |
| 6,440,193 | B1 | | 8/2002 | Johansen et al. ........... 75/10.27 |
| 6,530,970 | B2 | | 3/2003 | Lindstad .................... 75/10.27 |
| 6,849,101 | B1 | | 2/2005 | Fruehan et al. ............ 75/10.27 |
| 2006/0042413 | A1 | | 3/2006 | Fruehan | |

FOREIGN PATENT DOCUMENTS

WO    WO 2006/026771    3/2006

(Continued)

OTHER PUBLICATIONS

Database WPI Week 197330, Thomson Scientific, London, GB; AN 1973-427770; XP002498930; Alumina Briquette Produce Raw Material Aluminium Alloy.

(Continued)

Primary Examiner—George Wyszomierski
Assistant Examiner—Tima M McGuthry-Banks
(74) Attorney, Agent, or Firm—Greenberg Traurig, LLP (57) ABSTRACT

An agglomerate comprising alumina, carbon, and a binder for use in a vapor recovery reactor of a carbothermic alumina reduction furnace is disclosed. A method for using alumina-carbon agglomerates to capture aluminum vapor species and utilize waste heat from off-gases in a vapor recovery reactor to form a recyclable material is also disclosed.

14 Claims, 6 Drawing Sheets

FOREIGN PATENT DOCUMENTS

WO    WO 2007/012123      1/2007

OTHER PUBLICATIONS

Database WPI Week 198002, Thomson Scientific, London, GB; AN 1980-02553C; XP002498929; Fill Trap Active Carbon Alumina Pellet Comprise Body Upper Lower Metal Wire Mesh Up Flow Gas.

Database WPI Week 199303, Thomson Scientific, London, GB; AN 1993-025349; XP002498931; Anhydrous Aluminium Chloride Preparation Oxide Reduce Temperature Increase Degree Chlorinated.

International Search Report and Written Opinion from corresponding International Application No. PCT/US2008/068518, mailed Oct. 21, 2008.

Fruehan et al., *Mechanism and Rate of Reaction of $Al_2O$, $Al$, and $CO$ Vapors with Carbon*, Metallurgical and Materials Transactions B., vol. 35B, pp. 617-623, (2004).

Johansen et al., *Aluminum Carbothermic Technology Alcoa-Elkem Advanced Reactor Process*, Light Metals, pp. 401-406, (2003).

Johansen et al., *Carbothermic Aluminum-Alcoa and Elkem's new approach based on reactor technology to meet process requirements*, in Proceedings $6^{th}$ Conference on Molten Slags, Fluxes and Salts, Stockholm, Sweden-Helsinki Finland, (Jun. 12-17, 2002).

Motzfeldt, K. et al., *Molten aluminum oxycarbide, considered as an ionic mixture*, High Temperature Materials and Processes, vol. 20, pp. 241-245, (2001).

Motzfeldt, K. et al., *Carbothermal Production of Aluminum*, Aluminium-Verlag, pp. 64, (1989).

Schei, A. et al., *Production of High Silicon Alloys*, Trondheim, pp. 30-45, 99-103, 207-213, 219-220, (1998).

FAO Corporate Document Respository, Ch. 11, Briquetting of Charcoal, retrieved from the Internet on Dec. 17, 2007 at http://www.fao.org/docrep/x5328e/x5328e0c.htm.

\* cited by examiner

USE OF ALUMINA-CARBON AGGLOMERATES IN THE CARBOTHERMIC PRODUCTION OF ALUMINUM

FIELD OF THE INVENTION

The present invention relates to methods of and systems and apparatus for producing aluminum via a carbothermic reactor. In particular, the present invention relates to the use of alumina-carbon agglomerates in a vapor recovery reactor associated with a carbothermic furnace in the production of aluminum.

BACKGROUND OF THE INVENTION

The U.S. aluminum industry is one of the largest in the world with about 2.5 million metric tons of primary aluminum produced in 2005. Presently, the aluminum industry relies on three major processes for primary aluminum production: alumina refining from bauxite, anode production, and aluminum smelting by electrolysis in the Hall process. Hall electrolytic cells electrochemically reduce alumina to aluminum metal via carbon anodes and molten aluminum cathodes in the smelting process. Smelting is the most energy intensive step in primary aluminum production and accounts for between 2% and 3% of the electricity used in the U.S. every year (about 15 kWh/kg aluminum produced). Smelting also results in a variety of emissions, effluents, by-products and solid wastes. Greenhouse gases are a major pollutant from aluminum production and are caused by fossil fuel consumption, carbon anode consumption, and perfluorocarbons from anode effects. Emissions from anode production include particulates, fluorides, polycyclic aromatic hydrocarbons (PAH) and sulfur dioxide ($SO_2$). Emissions from aluminum smelting include carbon monoxide (CO), carbon dioxide ($CO_2$), $SO_2$, fluorides, perfluorocarbons (PFCs, e.g., $CF_4$, $C_2F_6$), and PAH. It would be advantageous to lower costs and reduce waste to remain competitive with foreign producers. The smelting step is a priority area for improvement because of high energy use and undesirable emissions and by-products implicated in climate change.

Carbothermic reduction of aluminum is an alternative process for aluminum production. Carbothermic aluminum production involves using carbon and temperature changes to effect production of aluminum. Carbothermic processes require much less physical space than the Hall electrolytic reduction process and could result in decreased electrical consumption. Long term estimates suggest the carbothermic process could reduce energy requirement by over 30% to about 8.5 kWh/kg. Carbothermic production of aluminum would also eliminate perfluorocarbon emissions resulting from carbon anode effects, hazardous spent potliners, and hydrocarbon emissions associated with baking of consumable carbon anodes. Thus, carbothermic production of aluminum would be more energy efficient and have less environmental impact than traditional aluminum production processes.

The direct carbothermic reduction of alumina to aluminum has been described in U.S. Pat. No. 2,974,032 (Grunert et al.), U.S. Pat. No. 4,099,959 (Dewing et al.), U.S. Pat. Nos. 4,033,757; 4,334,917; 4,388,107; and 4,533,386 (all Kibby), U.S. Pat. No. 6,440,193 (Johansen and Aune), U.S. Patent Publication No. US2006/0042413 (Fruehan), the *Proceedings 6th Conference on Molten Slags, Fluxes and Salts*, Edited by S. Seetharaman and D. Sichen "Carbothermic Aluminum", K. Johansen, J. Aune, M. Bruno and A. Schei, Stockholm, Sweden-Helsinki Finland, Jun. 12-17, 2002, and *"Aluminum Carbothermic Technology Alcoa-Elkem Advanced Reactor Process"*, Light Metals 2003, 401-406.

The overall aluminum carbothermic reduction reaction:

$$Al_2O_3 + 3C \rightarrow 2Al + 3CO \quad (1)$$

takes place, or can be made to take place, generally in steps such as:

$$2Al_2O_3 + 9C \rightarrow Al_4C_3 + 6CO \text{ (vapor)} \quad (2)$$

$$Al_4C_3 + Al_2O_3 \rightarrow 6Al + 3CO \text{ (vapor)} \quad (3)$$

$$Al_2O_3 + 2C \rightarrow Al_2O \text{ (vapor)} + 2CO \text{ (vapor)} \quad (4)$$

$$Al_2O_3 + 4Al \rightarrow 3Al_2O \text{ (vapor)} \quad (5), \text{ and}$$

$$Al \rightarrow Al \text{ (vapor)} \quad (6).$$

A large quantity of aluminum vapor species may be formed during various ones of the above reactions. To recover such vapor species, and the latent and sensible heat they contain, an external vapor recovery unit or vapor recovery reactor (VRR) may be employed. In the VRR, gases containing $Al_2O$ and Al vapors react with carbon to produce $Al_4C_3$ or $Al_4C_3$—$Al_2O$ slag. Examples of reactions that may occur in the VRR are provided below:

$$2\,Al_2O(g) + 5C \rightarrow Al_4C_3 + 2CO \quad (7)$$

$$5C \rightleftharpoons C_3 + C$$

$$4\,Al(g) + 3C \rightarrow Al_4C_3 \quad (8)$$

Prior methods of recovering Al vapor and $Al_2O$ from off-gases generated during carbothermic reduction of alumina are disclosed in U.S. Pat. No. 6,530,970 (Lindstad), U.S. Pat. No. 6,849,101 (Fruehan), and Fruehan et al., "Mechanism and Rate of Reaction of $Al_2O$, Al, and CO Vapors with Carbon", Metallurgical and Materials Transactions B., 35B, 617-623 (2004). Such references generally propose the use of hydrocarbons or charcoal for reaction with the off-gases. Furthermore, liquid hydrocarbon product may cause bridging of the particles in the reactor making it difficult to operate the vapor recovery reactor. Solid carbon particles may also become covered by reaction products, thereby reducing the reaction rate, eventually resulting in unreacted carbon entering the main carbothermic furnace, which is undesirable. Charcoal has good surface area and conversion rates, but is generally four times as expensive as petroleum products.

SUMMARY OF THE INVENTION

In view of the foregoing, a broad objective of the present invention is to facilitate a more efficient carbothermic aluminum production process.

A related objective is to efficiently capture aluminum vapor and aluminum suboxide vapor off-gases from the carbothermic alumina reduction furnace.

A further related objective is to recover the energy value of the off-gases.

A further related objective is to increase the efficiency of aluminum carbide and aluminum carbide slag formation in a vapor recovery reactor.

A related objective is to decrease the heat of the escaping off-gas from the vapor recovery reactor.

Yet a further related objective is to reduce the energy required in the main carbothermic furnace.

In addressing one or more of these objectives, the present inventors have recognized that solely utilizing a carbon feed stream to capture aluminum vapors does not facilitate capture of an economical amount of aluminum vapor species in the exiting off-gases. To capture more of the aluminum vapor species, it has been recognized that a heat sink may be utilized within the vapor recovery reactor to condense aluminum vapor species. It has been further recognized that the heat of condensation from the condensation of vapor species may be utilized to drive other chemical reactions to form materials to be recycled to the carbothermic reactor. Thus, at least some of the energy of the off gas may reclaimed, thereby facilitating more efficient operation of the carbothermic reactor and the corresponding vapor recovery reactor.

In this regard, it has been recognized that alumina-carbon agglomerates (e.g., a pellets) may be utilized as a heat sink. The alumina-carbon agglomerates may be fed to the vapor recovery reactor, wherein hot aluminum gases will condense on the surface of the colder alumina-carbon agglomerates. In turn, the heat of condensation may be utilized to drive chemical reactions between the materials of the agglomerate and/or the aluminum vapor species that result in the formation of recyclable material (e.g., slag, aluminum carbide). In one approach, a mixed feed material comprising alumina-carbon agglomerates and additional carbon, for example, carbon rings and/or charcoal briquettes, may be used so as to facilitate capture of aluminum vapor species and production of recyclable material. The recyclable material may be added to the main furnace to at least partially assist in the production of aluminum. For example, the recyclable material may be used during a slag making step. If a relatively high aluminum carbide content is achieved, the recyclable material may be used in the metal making step. Such materials, methods and systems facilitate efficient capture of off-gases from the main furnace and enable capture of at least some of the energy value of the off-gas.

In one aspect of the invention, an agglomerate for feeding into a vapor recovery reactor of an aluminum carbothermic production system is provided. The agglomerate generally comprises an alumina source, a carbon source, and a non-alkali/non-alkaline binder. The non-alkaline binder may be an organic binder or an alumina-based binder, such as activated alumina.

In one embodiment, the agglomerate has a molar ratio of carbon source to alumina source of at least about 3. In one embodiment, the agglomerate has a molar ratio of carbon source to alumina source of not greater than about 4.5. Thus, the agglomerate may have a molar ratio of carbon source to alumina source in the range of from about 3 to about 4.5. In related embodiments, the weight ratio of alumina source to carbon source is from about 2 to about 2.6. In a particular embodiment, the weight ratio of alumina source to carbon source is about 2.3.

The alumina and carbon sources may be mixed as appropriate to facilitate production of the agglomerate. In one approach, the agglomerate comprises a uniform mixture of the alumina source and the carbon source. In another approach, the agglomerate comprises a core and a shell at least partially surrounding the core, where the core comprises at least a portion of the alumina source and the shell comprises at least a portion of the carbon source. In one embodiment, the core consists essentially of the alumina source and a portion of the binder, and the shell consists essentially of the carbon source and a portion of the binder. In another embodiment, the core comprises the alumina source, a portion of the carbon source and a portion of the binder, and the shell consists essentially of at least a portion of the carbon source and a portion of the binder.

For agglomerates comprising an organic binder, the organic binder generally comprises less than about 10 weight % of the pellet. In one embodiment, the organic binder comprises less than about 5 weight % of the agglomerate. In one approach, the organic binder comprises a petroleum-based binder (e.g., a carbohydrate-based binder, a lignosulfonate salt-based binder). In one embodiment, the organic binder comprises at least one of coal tar pitch, asphalt, and petroleum pitch. In a particular embodiment, the organic binder consists essentially of coal tar pitch, asphalt, and petroleum pitch and combinations thereof. In another embodiment, a carbohydrate-based binders is used, which may comprise one or more of an aqueous sugar solution, wheat flour, corn flour, corn starch, potato flour, black cane syrup, dextran and dextrin binders. In a particular embodiment, the organic binder consists essentially of an aqueous sugar solution, wheat flour, corn flour, corn starch, potato flour, black cane syrup, dextran, dextrin and combinations thereof. In another embodiment, the lignosulfonate salt is used as the binder, such as one or more of calcium lignosulfonate, ammonia lignosulfonate, and sodium lignosulfonate. In a particular embodiment, the lignosulfonate salt consists essentially of calcium lignosulfonate, ammonia lignosulfonate, sodium lignosulfonate and combinations thereof.

The agglomerates may be any suitable shape. In one embodiment, the agglomerates are substantially spherical pellets. In another embodiment, a core of the agglomerate is shaped like a hollow cylinder and is at least partially surrounded by a carbon shell.

Methods for recovering off-gases from a carbothermic aluminum furnace are also provided. In one aspect, a method includes the steps of passing a feedstock comprising an alumina-carbon agglomerate through a vapor recovery reactor, flowing off-gases from a carbothermic reactor into the vapor recovery reactor, treating, concomitant to the passing step, the off-gases with the feedstock, and recovering at least some recyclable material for re-use in the carbothermic aluminum furnace. In a particular embodiment, the recyclable material comprises at least one of aluminum carbide and aluminum-carbide containing slag.

In one approach, the treating step comprises heating the feedstock with the off-gases. In a related approach, the treating step comprises condensing at least some of the vapors of the off-gas on a surface of the alumina-carbon agglomerate. In one approach, the treating step comprises reacting aluminum vapor species with carbon-containing materials of the alumina-carbon agglomerate, thereby forming at least some of the recyclable material. In a related approach, alumina of the alumina-carbon agglomerate is reacted with carbon to form at least some of the recyclable material. In a particular embodiment, the alumina-carbon agglomerate comprises a core and a shell substantially surrounding the core, wherein the core comprises alumina and the shell comprises carbon. In this embodiment, the treating step may include the steps of reacting the off-gas with the carbon of the shell, exposing the core of the alumina-carbon agglomerate, and reacting the alumina of the core with carbon (e.g., the carbon shell or another carbon source).

The alumina and carbon of the alumina-carbon agglomerate may be any of alumina and carbon sources mentioned herein. The step of passing the feedstock through the vapor recovery reactor may include the steps of feeding the feedstock from a feed source (e.g., a hopper). In turn, the feedstock may be pushed toward an inlet of and into the vapor recovery reactor via a suitable apparatus (e.g., a screw-drive).

In one approach, the method may include the step of feeding, concomitant to the passing step, a separate carbon source into the vapor recovery reactor. In this approach, the separate carbon source may be utilized to promote condensation of aluminum vapor species and/or promote production of recyclable material via reaction of the separate carbon source with the aluminum vapor species and/or the alumina-carbon agglomerates. The separate carbon feed may comprise a porous carbonaceous material, thereby facilitating mass transfer within the vapor recovery reactor. In one embodiment, the separate carbon feed comprises one or more of the carbon sources utilized to make the alumina-carbon agglomerate. In a particular embodiment, the separate carbon feed comprises at least one of a sphere, a briquette, a ring, and a cylinder. In another embodiment, the separate carbon source is generated in situ in the vapor recovery reactor (e.g., production of charcoal from wood).

BRIEF DESCRIPTION OF THE DRAWINGS

The invention is further described with reference to the accompanying non-limiting drawings in which.

DETAILED DESCRIPTION

Figure 1:
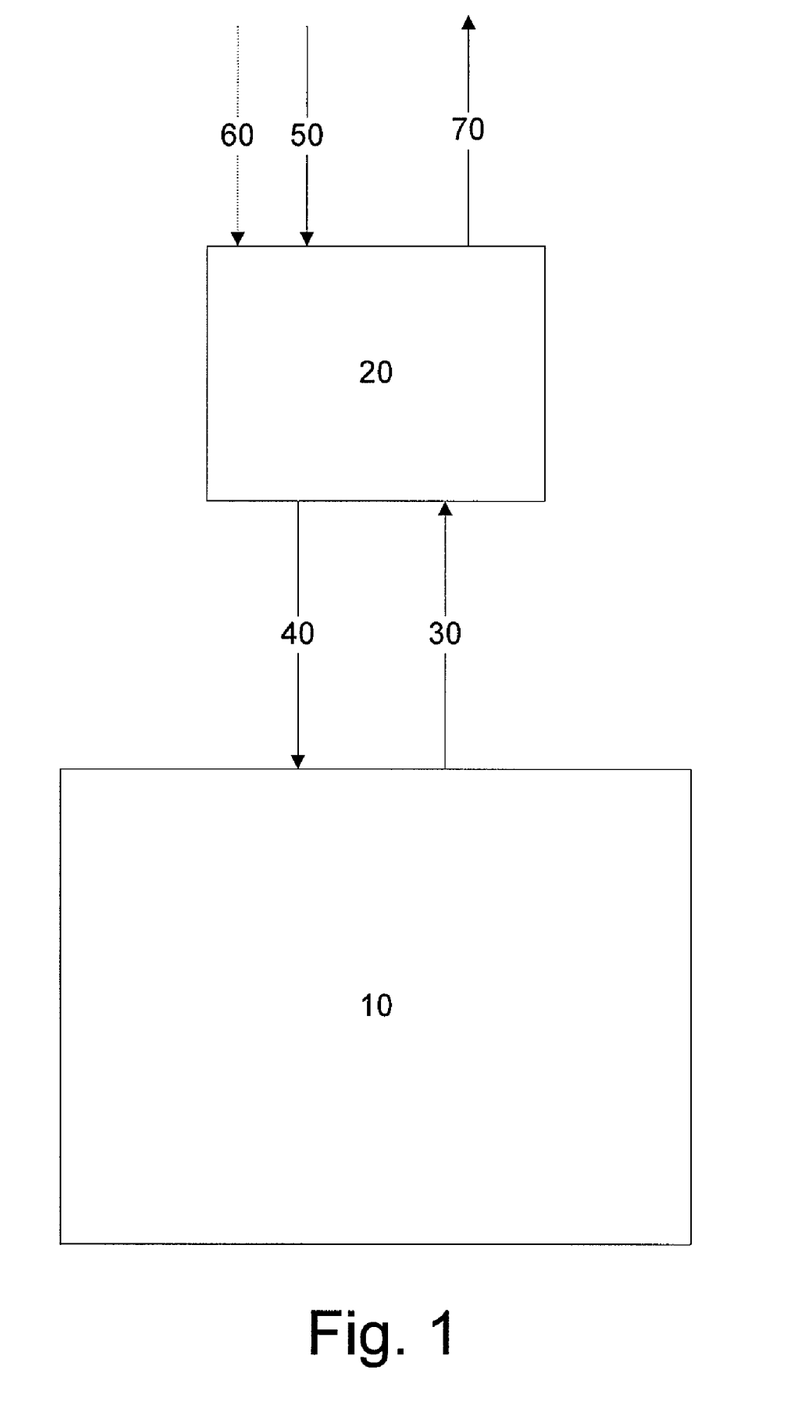
FIG. 1 illustrates a schematic view of one embodiment of a carbothermic aluminum production system.

Reference will now be made to the accompanying figures, which at least assist in illustrating various pertinent features of the present invention. Referring now to FIG. 1, one embodiment of a system for carbothermically producing aluminum is provided. The system includes a main carbothermic furnace 10 and a vapor recovery reactor 20 (also referred to herein as a VRR). As described in further detail below, during operation of the carbothermic furnace 10, off-gases 30 (e.g., Al (v) and $Al_2O$ (v)) are generated and are provided to the vapor recovery reactor 20 via one or more conduits (not illustrated). An alumina-carbon feed 50 is fed to the vapor recovery reactor 20 to react with the off-gases 30, thereby producing recyclable material 40 (e.g., aluminum carbide, aluminum carbide slag, alumina). Other materials 70 (e.g., carbon monoxide gas) may exit the VRR. A separate carbon feed 60 may optionally be fed to the vapor recovery reactor 20 to assist in the production of the recyclable material 40.

The main carbothermic furnace 10 may be any suitable furnace capable of carbothermically producing aluminum. For example, the carbothermic furnace 10 may be a single zone batch reactor, such as disclosed in U.S. Patent Application Publication No. 2006/0042413 to Fruehan, which is incorporated herein by reference in its entirety, or a dual zone reactor, such as disclosed in U.S. Pat. No. 6,440,193 to Johansen et al., which is incorporated herein by reference in its entirety.

In the first step of a carbothermic process using a batch methodology, alumina ($Al_2O_3$) and carbon (C) are added to the carbothermic furnace 10 to produce slag ($Al_2O_3$—$Al_4C_3$+ $Al_4C_3$) and excess solid $Al_4C_3$. The carbothermic furnace 10 operates generally at about 1875° C. to 2050° C. during the slag making step. Off-gases 30 may be produced in the slag making step and may contain various aluminum species including Al (vapor), aluminum suboxide ($Al_2O$, vapor) and carbon monoxide (CO). These off-gases 30 may be provided to the vapor recovery reactor 20.

After the slag producing step, a metal making step is undertaken, where an Al—C alloy upper phase and a lower slag phase are formed by elevating the temperature of the carbothermic furnace 10 to between about 2050° C. to about 2100° C. Off-gases 30 may also be produced during the metal forming step, and may also contain aluminum vapor species. The off-gas 30 from the metal forming step may also be provided to the vapor recovery reactor 20. After the metal making step, a metal tapping step is completed, where the Al—C alloy is removed from the carbothermic furnace 10 for further processing to produce the aluminum.

The aluminum vapor species that leave the carbothermic furnace 10 during the slag making and metal making steps should be recovered and returned to the carbothermic furnace 10 in order for the overall process to be economically viable. Excess energy can also be recovered from the off-gases 30, which generally exit the carbothermic furnace 10 at temperatures between 1950° C. and 2100° C. For example, the heat of condensation (i.e., the standard enthalpy change of condensation) from condensation of the aluminum vapor species on the surface of the alumina-carbon feed 50 materials may be used to react an alumina source and a carbon source to form at least a portion of the recyclable material 40. The condensed aluminum species may also react with the alumina-carbon 50 feed materials.

To capture the aluminum species, the vapor recovery reactor 20 is generally utilized. The vapor recovery reactor 20 may be, for example, a vapor recovery reactor as described in U.S. Pat. No. 6,530,970 to Lindstad, which is incorporated herein by reference in its entirety. In one embodiment, the bottom of the VRR column bed will directly interconnect with the carbothermic furnace 10. The VRR 20 serves at least two purposes. First, the VRR 20 captures at least some of the Al vapor species via reaction with the alumina-carbon feed 50. For example, the aluminum vapor species may react with carbon of the alumina-carbon feed 50 to form the recyclable material 40, such as via the below reaction:

$$6\,Al_2O_{(g)}+2Al_{(g)}+16.5\,C_{(s)} => 3.5\,Al_4C_{3(s)}+6\,CO_{(g)} \qquad (9)$$

Second, the VRR 20 recovers chemical and sensible heat energy from the off-gas 30. In one approach, aluminum vapor species are captured via condensation. In a related approach, the heat of condensation is used to promote reaction of the alumina-carbon feed 50 to form the recyclable material 40, which may contain one or more of the following species in any combination: $Al_3C_4$, $Al_2O_3$—$Al_4C_3$ slag, $Al_2O_3$+C mixed solids, $Al_4O_4C$, $Al_2OC$, $Al_2O_3$, and unreacted carbon. Thus, production of recyclable material 40 is facilitated, and with little or no outside energy input.

As noted above, the alumina-carbon feed 50 is utilized with the VRR 20 to produce the recyclable material 40. In one embodiment, a countercurrent configuration is utilized, wherein the alumina-carbon feed 50 flows countercurrent to the flow of the off-gases 30 in the VRR 20 to facilitate production of the recyclable material 40.

The alumina-carbon feed 50 comprises a composite alumina-carbon material, such as alumina-carbon agglomerate. In this regard, energy can be recovered from the off-gases 30 by reacting composite agglomerates comprising alumina ($Al_2O_3$) and carbon (C) to produce carbide ($Al_4C_3$) or slag in the VRR 20. In this regard, aluminum vapor species created in the carbothermic alumina reduction process may be collected in the vapor recovery reactor 20 and treated with alumina-carbon agglomerates to create a recyclable material comprising $Al_4C_3$, which may be fed to the carbothermic furnace 10 to assist in, for example, the slag making step.

In one embodiment, the alumina-carbon material is agglomerated or aggregated prior to addition to the VRR 20. In one aspect, a binder is used to hold alumina and carbon together. Agglomeration has several advantages over a bed of mixed pure materials. Agglomeration uses fine powders of the individual materials to form larger agglomerates for ease of handling. Agglomerates also add structure to the VRR 20 column bed and allow passage of the off-gases 30 through the VRR 20. The intimate contacting of the fine powders in the agglomerate can give more rapid reaction kinetics as compared to equivalent size agglomerates of separate pure materials. Agglomerates may also have more uniform properties (e.g., density, thermal conductivity, heat capacity), which eliminate segregation and differential reaction during passage through the VRR 20. Agglomerates can be shaped and sized to optimize distribution and to restrict or minimize gas pressure drop in the VRR 20 and facilitate handling/feeding in the VRR 20. Agglomerate composition (e.g., the ratio of alumina to carbon in the agglomerate) can further be adjusted to facilitate reaction with aluminum vapors and production of aluminum carbide or other desired species.

As the composite alumina-carbon agglomerate flows through the VRR 20, it absorbs heat and its temperature gradually increases. When the agglomerate reaches the proper temperature, the alumina melts and reacts with the carbon to produce an $Al_4C_3/Al_2O_3$ slag, absorbing heat in the process. At a somewhat higher temperature, this slag self-reacts to produce solid $Al_4C_3$, again absorbing heat. In this fashion, the energy value (e.g., heat value) of the off-gases can be captured and put to use, such as, for example, equations 9 and 10, below.

$$51\ CO_{(g)} + 6\ Al_2O_{(g)} + 2\ Al_{(g)} \rightarrow 7\ Al_2O_{3(s)} + 15\ C_{(s)} + 36\ CO_{(g)} \tag{10}$$

$$51\ CO_{(g)} + 6\ Al_2O_{(g)} + 2\ Al_{(g)} \rightarrow 1.67\ Al_4C_{3(s)} + 3.67\ Al_2O_{3(s)} + 46\ CO_{(g)} \tag{11}$$

Thus, a VRR utilizing an alumina-carbon agglomerate feed can act as a pre-reactor to produce at least some of, and possibly the majority of, the aluminum carbide needed for production processes of the carbothermic furnace.

The carbon source may be any source of carbon that may react with alumina to form the recyclable material 40 via interaction with the alumina source and/or the off-gases 30, and that is suitable for agglomeration with the alumina source. In one embodiment, charcoal is used as the carbon source. In another embodiment, a petroleum source, such as petroleum coke fines, is utilized as the carbon source. Some other useful carbonaceous sources include wood charcoal, metallurgical coke, petroleum coke, cokified carbohydrates, and chemically purified coal. Other carbon sources may be used.

The alumina source may be any suitable source of alumina that is adapted to form the recyclable material 40 via interaction with the carbon source and/or the off-gases 30, and that is suitable for agglomeration with the carbon source. When composite pellets are used, the alumina source may be fine alumina ($Al_2O_3$, e.g., smelting grade alumina (SGA) or electrostatic precipitator (ESP) alumina dust), which can be mixed with a carbon source, for example finely divided petroleum coke, and made into a pellet. Conventional SGA is about 50-150 microns in diameter. Conventional SGA has been optimized commercially for use in Hall electrolytic cells and is an economically suitable source of alumina.

Various binders may be used to form the alumina-carbon agglomerates. In one aspect, the binder is an organic binder. In one approach, a carbohydrate-based binder may be employed, such as aqueous sugar solutions, corn starch, corn flour, wheat flour, potato starch, black cane syrup, dextran, dextrin and the like. In another approach, various lignosulfonates, such as calcium lignosulfonate, ammonia lignosulfonate, and sodium lignosulfonate, may be employed as binders. In another approach, hydrophobic petroleum-based organic binders, such as coal tar pitch, asphalt emulsion, and petroleum pitch, may be utilized. In another approach, the binder is an inorganic binder comprising activated alumina. In a particular embodiment, the binder consists essentially of activated alumina and water. One or more binders may be utilized to form a binder system for the alumina-carbon agglomerate.

In one aspect, the mixture used to create the agglomerates comprises not greater than about 10% weight binder, such as not greater than about 5% weight binder, or even not greater than about 3% weight binder. Thus, the agglomerate may contain not greater than about 10% by weight binder, such as not greater than about 5% weight binder, or even not greater than about 3% binder by weight. In a related aspect, the mixture used to create the agglomerates comprises at least about 0.5% weight binder, such as at least about 1% weight binder, or even 1.5% weight binder. Thus, the agglomerates may contain at least about 0.5% weight binder, 1% weight binder, or even 1.5% weight binder. The mixture used to create the agglomerates, or the agglomerates themselves, may thus contain binder in the range of 0.5% to 10% weight binder, such as 0.5% to 5% weight binder, or even 0.5 to 3% weight binder. In one embodiment, the mixture used to create the agglomerates, or the agglomerates themselves, contain binder in the range of 1% to 10% weight binder, 1% to 5% weight binder, or even 1% to 3% weight binder. In one embodiment, the mixture used to create the agglomerates, or the agglomerates themselves, contain binder in the range of 1.5% to 10% weight binder, 1.5% to 5% weight binder, or even 1.5% to 3% weight binder.

The alumina and carbon sources may be co-mingled in various ways to create the agglomerates. In one embodiment, the alumina source and a carbon source are mixed uniformly. In another embodiment, the agglomerate includes a core containing at least the alumina source and this core is further surrounded by a shell comprised mainly of (and in some instances consists essentially of) a carbon source.

The alumina-carbon agglomerates may be any suitable size, which may be dependent on the processing conditions of the carbothermic furnace 10 and/or the VRR 20. Smaller pellet sizes may more efficiently absorb heat from the off-gases 30. Thus, for substantially spherical agglomerates utilized in a conventional VRR 20 operated at normal operating conditions, the agglomerates may have a diameter of from about 3 mm to about 30 mm, such as from about 5 mm to about 20 mm, or even such as from about 10 mm to 15 mm. Thus, the agglomerates may have a diameter of not greater than about 30 mm and at least about 3 mm.

In a mixed feed approach (e.g., feeding both an alumina-carbon feed 50 and a carbon feed 60 to the VRR 20, as described in further detail below), smaller agglomerates may coat the additional carbon feed 60 with slag, which may decrease the efficiency and production rate of the recyclable material 40.

Figure 2:
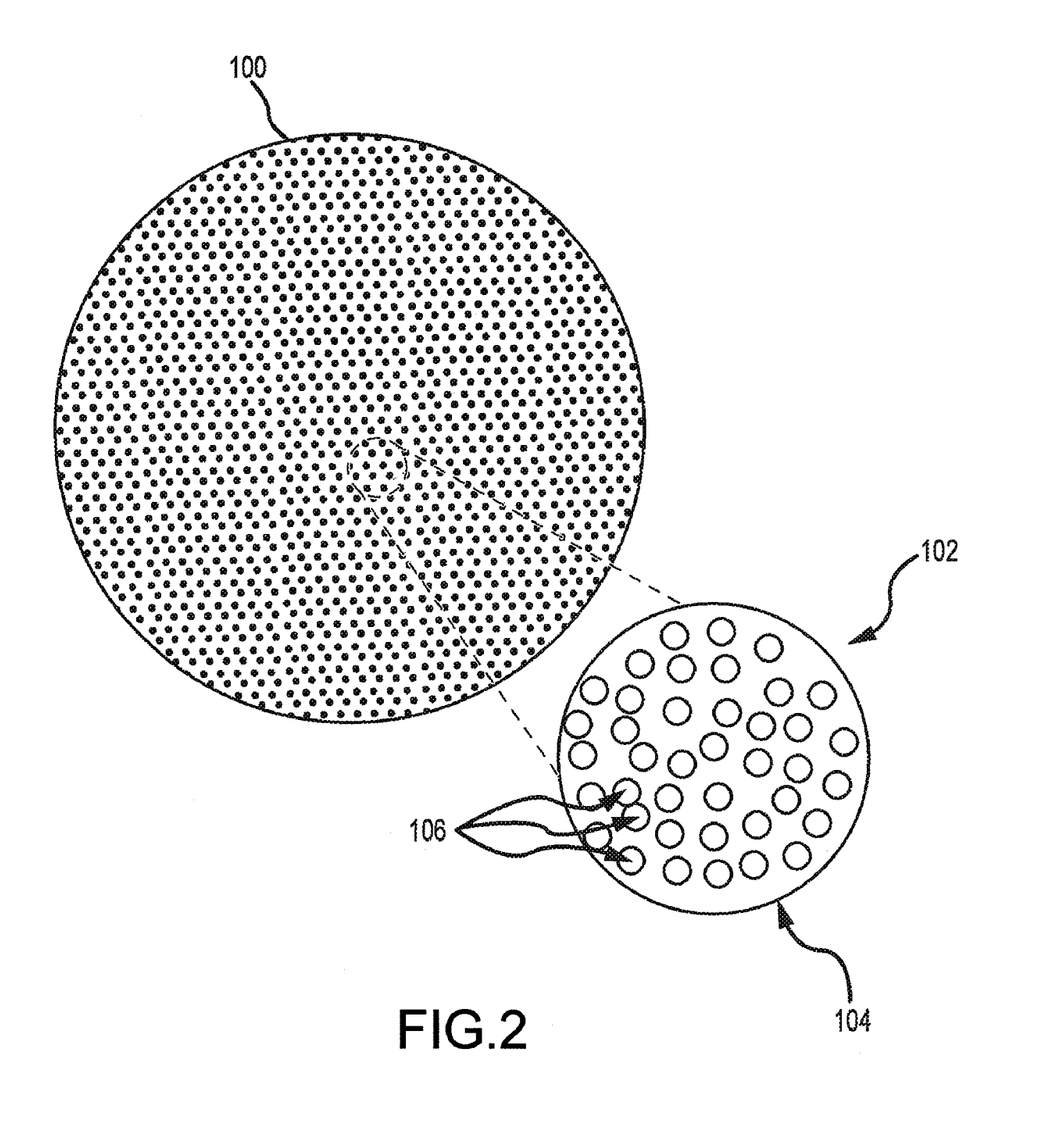
FIG. 2 is a schematic view of one embodiment of a composite alumina-carbon agglomerate having a spherical shape and including distinct alumina particles embedded in a carbon matrix.

A variety of alumina-carbon agglomerate shapes may be used. For example, the agglomerates may be substantially spherical pellets, an embodiment of which is illustrated in FIG. 2. In the illustrated embodiment, the composite pellet 100 comprises a matrix 102 of solid carbon source 104 with embedded alumina source 106 (e.g., alumina particles). The composite pellet 100 may comprise any suitable ratio of carbon source to alumina source. In one embodiment, the molar ratio of alumina to carbon can range between about 1:3 to about 1:4.5. In this embodiment, the weight ratio of alumina to carbon is from about 1.88 to about 2.83. In one embodiment, the weight ratio of alumina to carbon is about 2.2 to about 2.4.

During movement of the pellets 100 through the VRR 20, various phase changes and/or volumetric changes may occur during production of the recyclable material 40. For example, the alumina-carbon feed 50 may react to form aluminum carbide and/or slag, which may be in the form of a viscous paste-like substance. Furthermore, aluminum vapors may condense on the surface of the pellets 100. In turn, there is a potential for clogging of the VRR 20 due to liquid build-up and an overall volumetric decrease. To restrict flow of the produced recyclable material, a shell may be utilized in conjunction with the pellets 100. For example, and with reference to FIG. 3, the composite pellet 100 may further be at least partially surrounded by a shell 120. In the illustrated embodiment, the outer surface of the composite pellet 100 is completely surrounded by the shell 120. The shell 120 may comprise any material useful in producing the recyclable material 40 and/or restricting flow of produced recyclable material, such as a carbon source. In the latter regard, the carbon source may be any of the carbon sources described above, such as petroleum coke, which may be in calcined, green or needled form. In one embodiment, the shell 120 consists essentially of a carbon source and a binder. As described above, such a shell 120 may facilitate increased conversion of aluminum vapor species to recyclable material 40 via reaction with the shell 120 while promoting reaction of the alumina 106 and carbon 104 in the core 100 due to heat gained from the condensation of the aluminum vapor species on the surface of the pellets 100.

Figure 3:
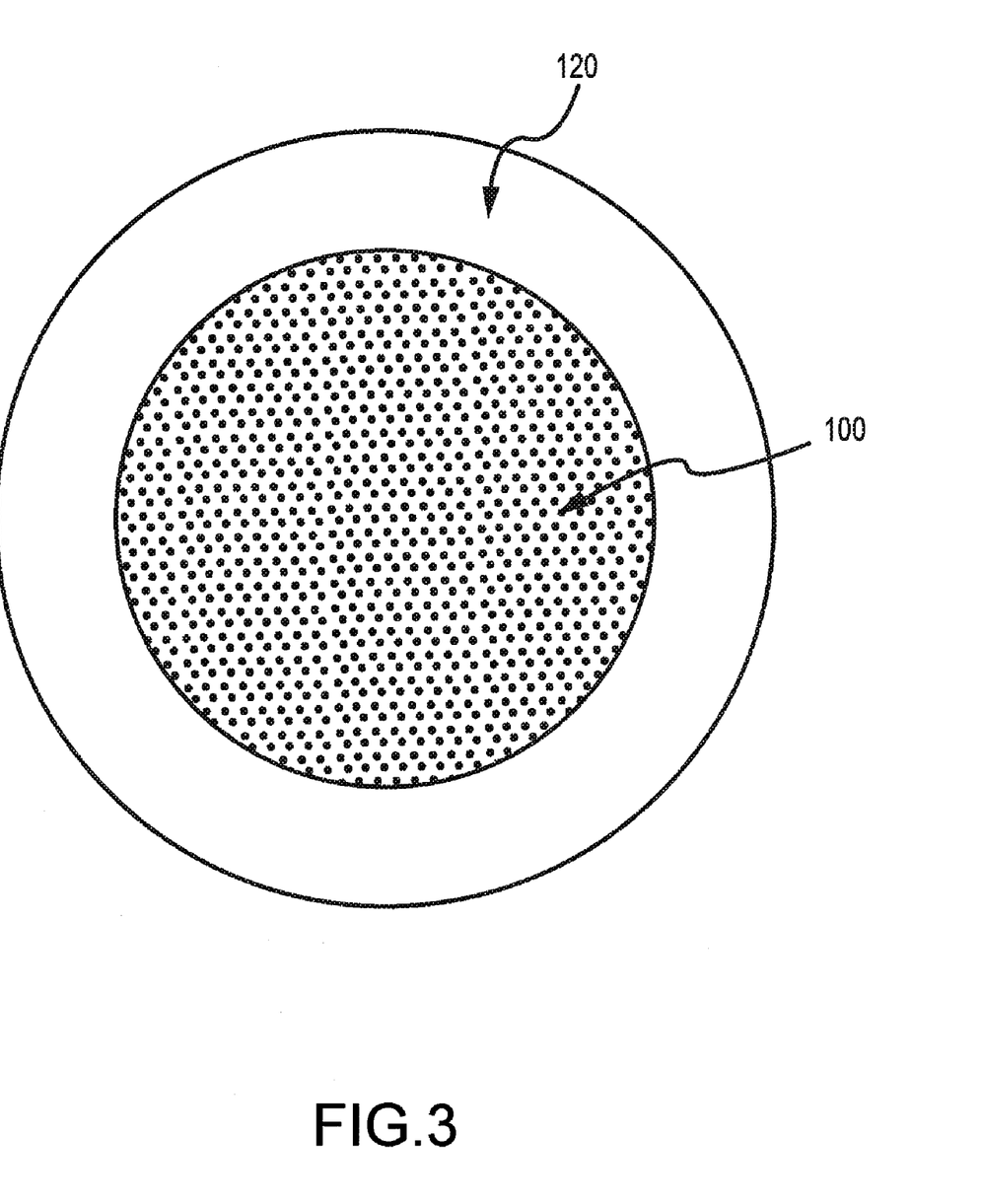
FIG. 3 is a schematic view of one embodiment of a composite alumina-carbon agglomerate.

The shell 120 may be eroded during movement through the vapor recovery reactor 20 due to reaction with aluminum vapor species and/or due to physical interaction with other pellets 100. As noted above, the size of the composite pellet 100 may be tailored to the process parameters of the carbothermic furnace 10 and/or the VRR 20. In turn, the shell 120 may also be sized in view of these processing parameters and the considerations provided above. The thickness of the shell 120 may be tailored to facilitate structural support and/or stoichiometry (e.g., reaction with aluminum vapor species), wherein pellets 100 exiting the vapor recovery reactor 20 include the at least a portion of the shell 120. Competing considerations generally dictate shell thickness. The shell 120 should be thick enough to maintain its structural integrity so as to restrict flow of produced recyclable material (e.g., slag created therein). However, providing excess carbon to the carbothermic furnace 10 is undesirable during metal making operations, and therefore it is appropriate, in some instances, to restrict the thickness of the shell 120. Thus, in some embodiments, the shell 120 has a thickness that is just thick enough to restrict flow of produced recyclable material, but is thin enough such that little excess carbon is provided to the carbothermic furnace 10. Hence, the shell 120 may have a first thickness as it enters the VRR and a second thickness as it exits that VRR, and this first thickness may be tailored so that the second thickness is substantially achieved as the pellets exit the VRR.

Figure 4:
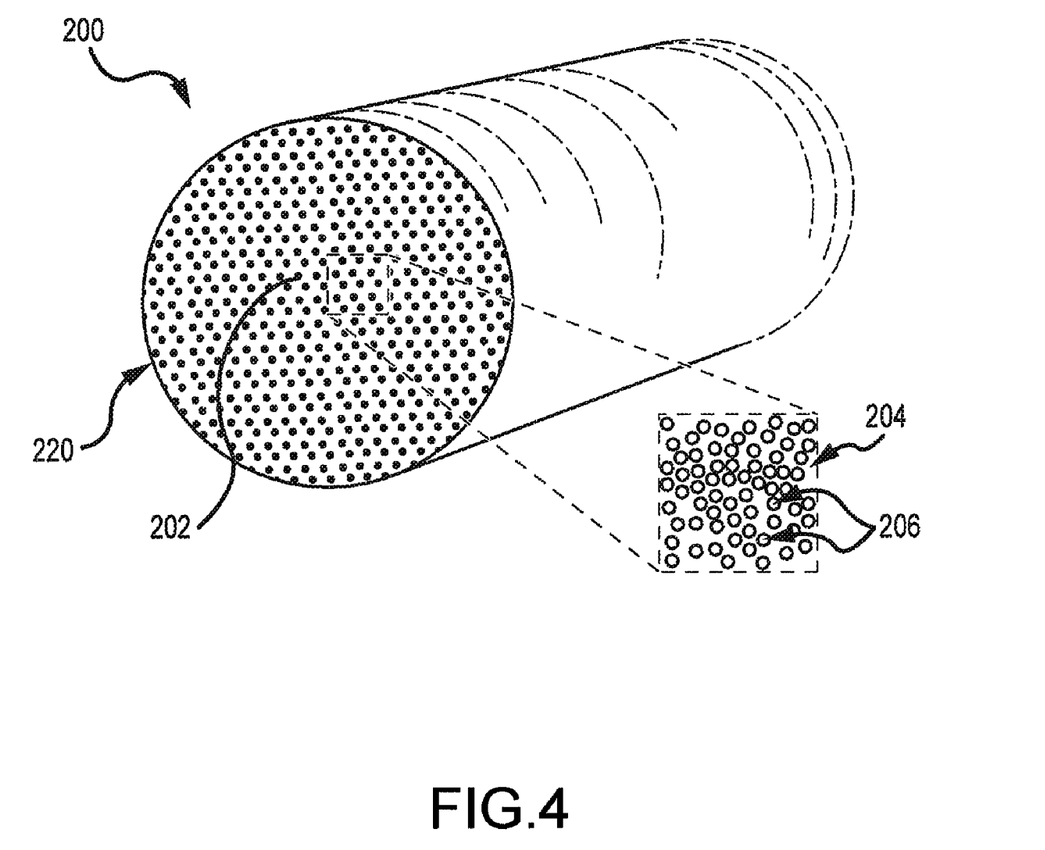
FIG. 4 is a schematic view of a cylindrical composite alumina-carbon agglomerate with an exterior carbon shell.

In another embodiment, the agglomerates may be substantially cylindrical. One embodiment of a cylindrical agglomerate is illustrated in FIG. 4. In the illustrated embodiment, the cylindrical agglomerate 200 comprises a matrix 202 of solid carbon source 204 with embedded alumina particles 206, such as described above with respect to FIG. 2. In the illustrated embodiment, the cylindrical agglomerate 200 also includes a shell 220, such as described above with respect to FIG. 3. However, the cylindrical agglomerate 200 may be utilized without the shell 220.

Cylindrical agglomerates 200 comprising a shell 220 may be useful, for instance, when structural support is desired, which may be provided by the shell 220, or when it is desired to segregate the alumina-carbon matrix from another carbon feed 60 (e.g., charcoal). In the latter regard, as the agglomerates 200 move through the VRR 20, the alumina-carbon matrix may react to form a viscous recyclable material, which could flow and contact the another carbon feed 60, resulting in restricted interaction of aluminum vapor species with the another carbon feed 60. To restrict the viscous recyclable material from contacting the another carbon feed 60, the shell 220 may be used to contain the produced viscous recyclable material. Furthermore, the shell 220 may restrict or prevent clogging of the VRR as the agglomerates 200 form recyclable material 40. When the cylindrical agglomerate 200 is converted to recyclable material 40, such as $Al_4C_3$, its volume may decrease. Due to the decreased volume, the bulk porosity of the bed within the VRR 20 may increase. Furthermore, if the recyclable material 40 is sufficiently viscous, it may cause clogging of the VRR 20. The shell 220 may prevent produced recyclable material from flowing outside of the shell 220, thereby restricting, and in some instances preventing, clogging of the VRR 20. Additionally, the shell 200 may assist in maintaining the bulk porosity of the VRR by restricting flow of the produced recyclable material. In one embodiment, additional carbon may be used in the agglomerate core and/or shell so as to facilitate maintenance of the structural integrity of the agglomerates.

The thickness of the shell 220 may be tailored depending upon the desired application. For example, the thickness may be sufficiently thick so as to facilitate structural integrity of the shell 220 as the agglomerate 200 flows through the VRR. The shell thickness may also be sufficiently thin so as to restrict the amount of unreacted carbon shell material, or other shell material, entering the carbothermic furnace 10 after exiting the VRR 20.

Figure 5:
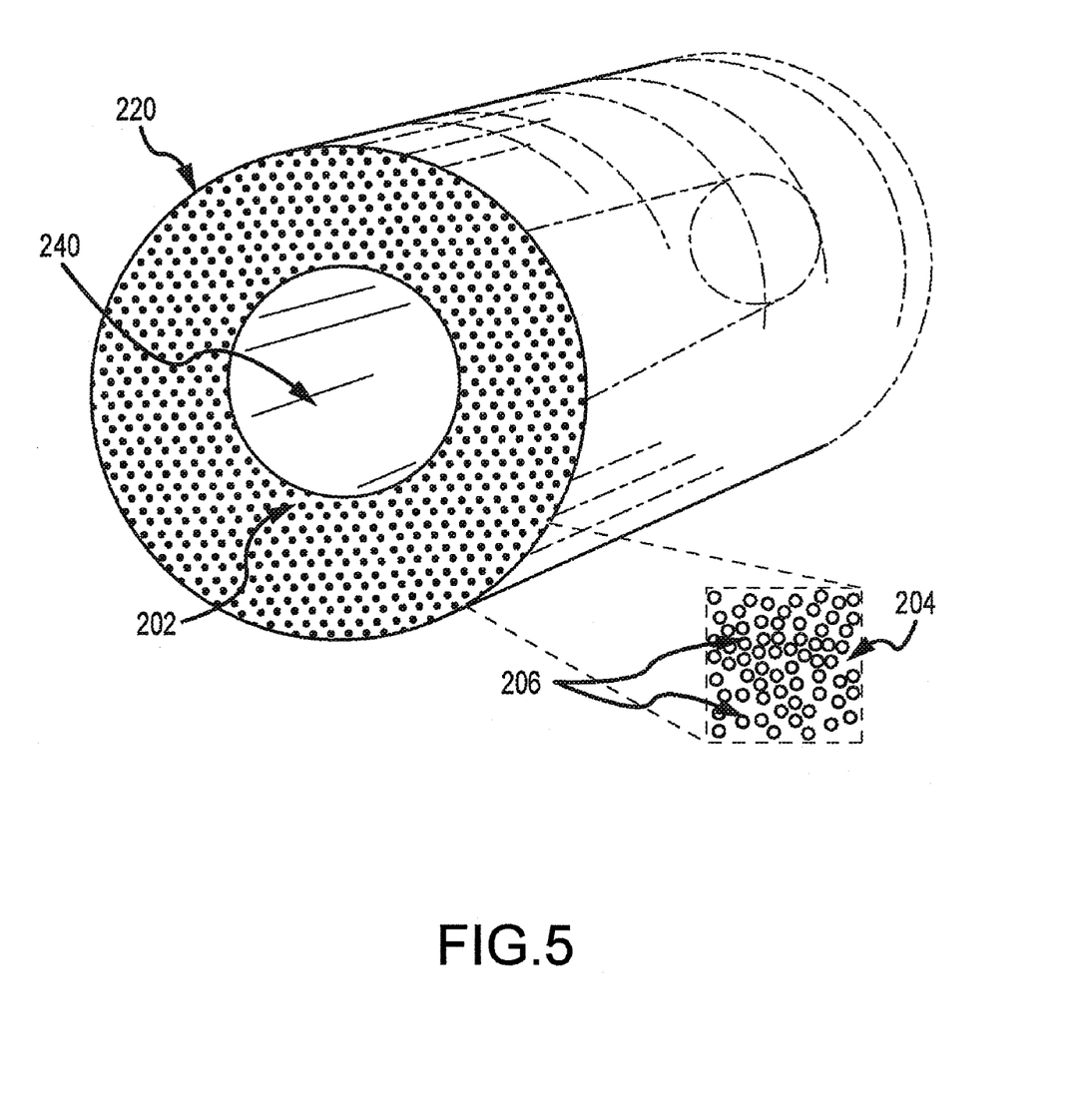
FIG. 5 is a schematic view of a cylindrical composite alumina-carbon agglomerate with an exterior carbon shell and a hollow core.

In a related embodiment, the cylindrical agglomerates 200 may comprise a hollow core, such as illustrated in FIG. 5. The hollow core 240 may facilitate heat and mass transfer to the interior of the pellet 200, thereby promoting production of the recyclable material 40.

In addition to sizing and shaping the agglomerates to as to facilitate heat transfer, mass transfer, kinetics and thermodynamics, the agglomerates should also be sufficiently strong so as to withstand the weight of the column in the VRR 20. Crush strength represents the resistance of a solid to compression forces. For a conventional VRR 20, the agglomerates may have a single agglomerate crush strength suitable to withstand normal crush forces experienced in at least some of the vapor recovery reactor 20.

The agglomerates may be manufactured by any suitable process. For example, a milling process may be used, where an alumina source and a carbon source are mixed with an organic binder. Water may also be optionally added, depending on the binder selected. The raw mixture may then be pelletized into green pellets, such as by wet tumbling with a balling disc or by a balling drum pelletizer. Subsequently, the green pellets may be hardened and/or dried. The temperature may be regulated by, for example, use of exhaust gas, heat-exchanged air or nitrogen gas. An extrusion process may also be utilized, such as when producing agglomerates comprising an outer carbon shell. Other methods of producing agglomerates may also be employed, such as via press and slurry techniques, As noted above, the alumina-carbon feed 50 may be utilized to facilitate production of the recyclable material 40 from the off-gases 30. In another embodiment, the alumina-carbon feed 50 may be utilized in conjunction with the carbon feed 60 to facilitate production of the recyclable material. More particularly, a mixed feed comprising both a carbon feed 60 and alumina-carbon feed 50 may be utilized. In operation, the energy value of the off-gas 30 is used to drive carbide formation in the alumina-carbon feed 50. Concomitantly, the separate carbon feed 60 reacts with aluminum vapor species to produce aluminum carbide.

Figure 6:
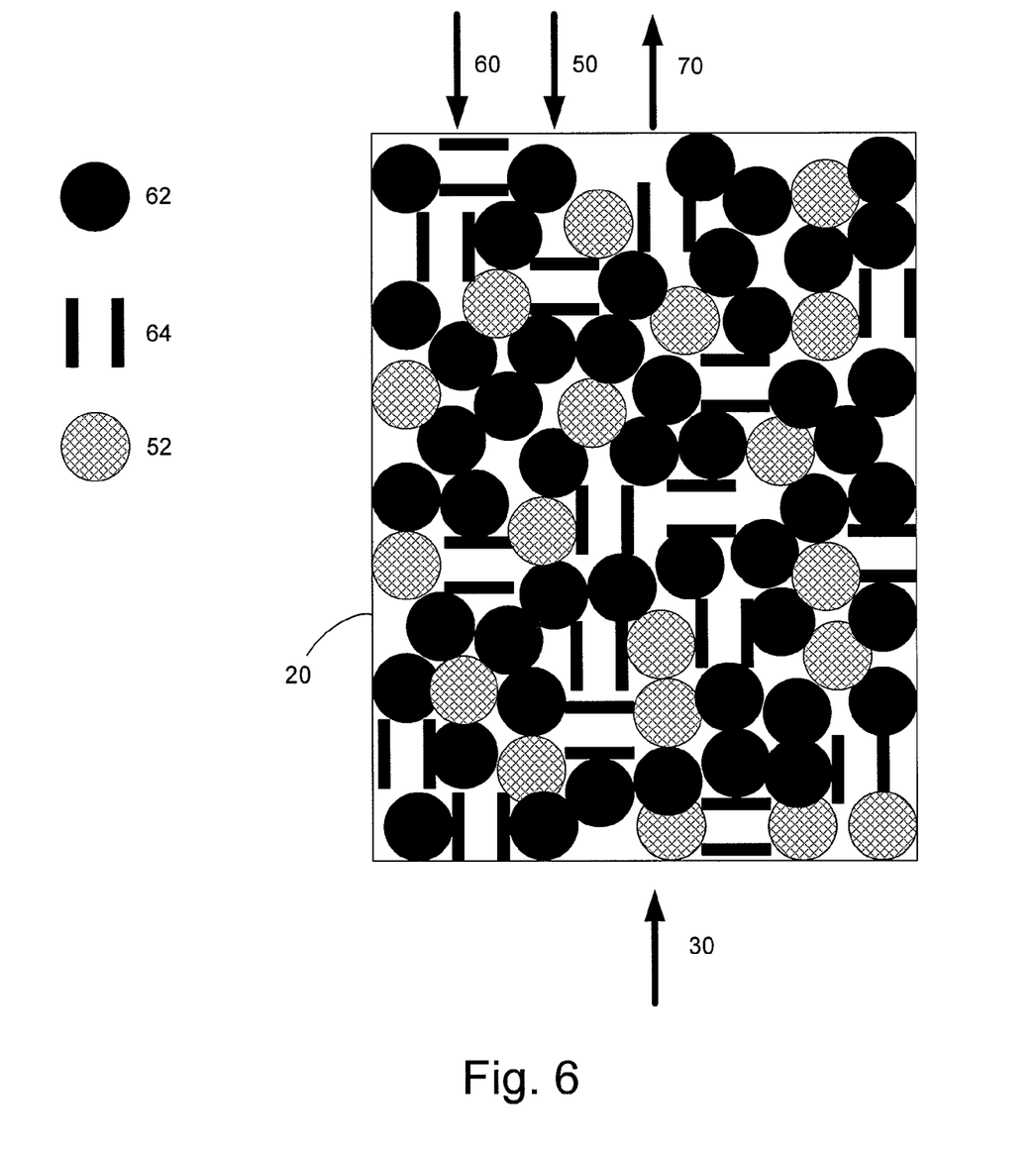
FIG. 6 is a schematic view of one embodiment of a vapor recovery reactor with a mixed-feed.

One embodiment of a mixed feed configuration is illustrated in FIG. 6. In the illustrated embodiment, the vapor recovery reactor 20 receives off-gases 30 from the carbothermic furnace 10 (not illustrated). The vapor recovery reactor 20 also receives a mixed feed comprising an alumina-carbon feed 50 and a carbon feed 60. The alumina-carbon feed 50 may be any of the above-described alumina-carbon agglomerates, including the illustrated alumina-carbon pellets 52. The carbon feed 60 may be any suitable carbonaceous material. In the illustrated embodiment, the carbon source includes a first carbonaceous material 62 and a second carbonaceous material 64. The first carbonaceous material 62 may be, for example, a carbon-containing agglomerate having a first porosity. The second carbonaceous material 64 may have a higher porosity relative to the first carbon material 62. In the illustrated embodiment the first carbon source 62 is a carbon pellet and the second carbon source 64 is a carbon ring. As noted above, the VRR 20 may become clogged if excess slag and/or condensation occurs. To restrict clogging and facilitate gas flow through the VRR, carbonaceous rings 64 may be utilized within the VRR. The addition of carbon rings 64 will give the VRR greater porosity and more openings for gas flow. Carbon rings 64 will travel through the moving bed partially reacting with aluminum vapor species, but will maintain structural integrity. Carbon rings can be mass-produced by extruding a pet coke/pitch mixture through circular dies and then cutting the extruded cylinders off with a revolving blade. The carbon rings are then calcined, such as in situ in cooler portions of the VRR. The optimum size and shape of the rings may be optimized to provide high strength and porosity for the least amount of carbon. Thinner-wall rings may be more desirable if structural integrity is maintained. Longer rings might pack more like straw, providing greater VRR bed porosity and leaving an open structure if the alumina-carbon pellets 52 and/or other carbon pellets 62 collapse. Thus, the carbon feed 60 may include a plurality of different carbon sources to facilitate production of recyclable material 40 and mass transfer of gases through the vapor recovery reactor 20.

As noted above, the carbon feed 60 may include one or more of the above-described carbonaceous materials. One useful carbonaceous material is charcoal. Charcoal has a high surface area and a high reactivity with the $Al(g)$ and $Al_2O$, and thus readily produces slag or solid $Al_4C_3$. Charcoal also has a high crush strength, which may provide structural integrity to the bed. When utilizing charcoal as at least a portion of the carbon feed 60, particle size may be considered. Optimal charcoal particle diameter varies from application to application. A smaller particle diameter leads to a greater conversion of carbon to carbide, but also leads to a greater pressure drop within the VRR and possibly an increase in the likelihood of clogging the column. Furthermore, stoichiometry may be evaluated. Complete conversion of charcoal may not be desirable since charcoal may provide structural integrity to the VRR bed. In one aspect, the carbon feed 60 may consist essentially of charcoal briquettes. In another aspect, another carbonaceous material (e.g., pet coke and/or pitch) could be utilized within one or more charcoal briquettes.

In one embodiment, charcoal may be generated in situ within the VRR 20. For example, the carbon feed 60 may comprise saw dust, crumbled bark, pitch or other cellulosic material, wherein the energy value of the off gases 30 is utilized to dehydrate and react such cellulosic material into charcoal. In situ charcoal generation is described in Fruehan et al., Metall.Mater. Trans. B, 35B, pp 617-623, 2004, which is herein incorporated by reference. Furthermore, the shape and size of the in situ generated charcoal could be tailored. Knowing the charcoalization shrinkage, it would be possible to tailor the characteristics of the final charcoal briquette. In one aspect, the in situ charcoal could be generated in a specific size or shape. For example, the size and shape of a wood agglomerate could be extruded into rings to produce carbon rings 64, described above. Furthermore, the porosity of the produced charcoal could be controlled on various levels, from the micro-porosity of the wood cell lumen to the macro-porosity of the agglomerated saw-dust particles, to achieve the desired porosity within the VRR during operation of the reactor.

As noted above, the alumina-carbon feed is generally utilized with the VRR 20 to facilitate recovery of aluminum vapor species. However, it is anticipated that at least some of the alumina-carbon feed could also be fed directly to the carbothermic reactor 10 (e.g., during slag making) to promote capture of aluminum vapor species within the reactor.

Having described certain embodiments, it is to be understood that the invention may be otherwise embodied within the scope of the appended claims. Whereas particular embodiments of this invention have been described above for purposes of illustration, it will be evident to those skilled in the art that numerous variations of the details of the present invention may be made without departing from the invention as defined in the appended claims.

What is claimed is:

1. An agglomerate for feeding into a vapor recovery reactor of an aluminum carbothermic production system, the agglomerate comprising:
   a cylinder comprising a hollow core and a shell at least partially surrounding the hollow core;
   wherein the hollow core comprises an alumina source;
   wherein the shell comprise a carbon source; and
   an organic binder wherein the organic binder comprises less than about 10 weight % of the pellet.

2. The agglomerate of claim 1, wherein the organic binder comprises less than about 5 weight % of the agglomerate.

3. The agglomerate of claim 1, wherein the molar ratio of carbon source to alumina source is at least about 3.

4. The agglomerate of claim 1, wherein the molar ratio of carbon source to alumina source is not greater than about 4.5.

5. The agglomerate of claim 1, wherein the molar ratio of carbon source to alumina source is within the range of from about 3 to about 4.5.

6. The agglomerate of claim 1, wherein the weight ratio of alumina source to carbon source is from about 2 to about 2.6.

7. The agglomerate of claim 6, wherein the weight ratio of alumina source to carbon source is about 2.3.

8. The agglomerate of claim 1, wherein the carbon source is selected from the group consisting of wood charcoal, metallurgical coke, petroleum coke, cokified carbohydrates, and chemically purified coal.

9. The agglomerate of claim 1, wherein the carbon source is charcoal.

10. The agglomerate of claim 1, wherein the carbon source is petroleum coke.

11. The agglomerate of claim 1, wherein the binder is selected from the group consisting of hydrophobic petroleum-based organic binders, carbohydrate- based binders, and lignosulfonate salts.

12. The agglomerate of claim 11, wherein the hydrophobic petroleum- based binders are selected from the group consisting of coal tar pitch, asphalt, and petroleum pitch.

13. The agglomerate of claim 11, wherein the carbohydrate-based binders are selected from the group consisting of an aqueous sugar solution, wheat flour, corn flour, corn starch, potato flour, black cane syrup, dextran and dextrin.

14. The agglomerate of claim 11, wherein the lignosulfonate salts are selected from the group consisting of calcium lignosulfonate, ammonia lignosulfonate, and sodium lignosulfonate.

* * * * *